United States Patent [19]
Minsky

[11] Patent Number: 5,956,525
[45] Date of Patent: Sep. 21, 1999

[54] METHOD OF MEASURING BODY MEASUREMENTS FOR CUSTOM APPAREL MANUFACTURING

[76] Inventor: Jacob Minsky, 250 174th St., Apt. 1101, North Miami Beach, Fla. 33160

[21] Appl. No.: 08/946,563

[22] Filed: Oct. 7, 1997

Related U.S. Application Data

[60] Provisional application No. 60/055,200, Aug. 11, 1997.

[51] Int. Cl.⁶ ............................. A41H 1/02; G03B 15/00; G06F 19/00
[52] U.S. Cl. .................................. 396/3; 33/15; 364/470.06
[58] Field of Search ........................... 396/1, 2, 3; 33/2 R, 33/3 A, 3 B, 3 C, 11, 15, 17 R, 755, 758, 759, 760, 764, 768, 770, 511, 512, 194, 832; 364/470.01, 470.03, 470.06; 702/155; 177/5

[56] References Cited

U.S. PATENT DOCUMENTS

| | | | |
|---|---|---|---|
| 1,236,272 | 8/1917 | Costley | 177/5 |
| 1,372,732 | 3/1921 | Woodrich | 33/2 R |
| 2,374,654 | 5/1945 | Cooke | 33/15 |
| 3,089,244 | 5/1963 | Amselle | 33/2 R |
| 3,383,770 | 5/1968 | Xenakis | 33/2 R |
| 3,902,182 | 8/1975 | Hillborg | 396/3 |
| 4,598,376 | 7/1986 | Burton et al. | 364/470.03 |
| 4,853,866 | 8/1989 | Galan et al. | 364/470.06 |
| 4,868,990 | 9/1989 | Steinberg | 33/15 |
| 4,885,844 | 12/1989 | Chun | 33/15 |
| 4,916,624 | 4/1990 | Collins et al. | 364/470.03 |
| 5,163,006 | 11/1992 | Deziel | 364/470.03 |
| 5,163,007 | 11/1992 | Slilaty | 364/470.03 |
| 5,487,011 | 1/1996 | Chaiken | 364/470.06 |
| 5,495,568 | 2/1996 | Beavin | 364/188 |
| 5,508,936 | 4/1996 | King et al. | 364/470.06 |
| 5,548,519 | 8/1996 | Park et al. | 364/470.06 |

FOREIGN PATENT DOCUMENTS

| | | |
|---|---|---|
| 0 302 843 | 2/1989 | European Pat. Off. . |
| 0 554 647 | 7/1996 | European Pat. Off. . |
| 784860 | 12/1980 | U.S.S.R. . |
| 1553041 | 3/1990 | U.S.S.R. . |
| 855101 | 11/1960 | United Kingdom . |
| 83/04366 | 12/1983 | WIPO . |

*Primary Examiner*—Safet Metjahic
*Assistant Examiner*—J. K. Han
*Attorney, Agent, or Firm*—Richard C. Litman

[57] ABSTRACT

A tailoring system and apparatus for tailoring clothing wherein body measurements are photographically recorded for computer data entry from special form fitting articles of clothing to which disposable strips of tape measures are temporarily adhesively affixed. The customer wears a body suit consisting of a top, a sleeve, and a leg leotard to which the disposable measuring tapes are attached around predetermined circumferential portions. The measuring tapes are attached by small pieces of a double sided adhesive tape that do not stick to the body suit when the measuring tapes are removed. The customer then stands on an elevated platform in the corner of a specially designed room and vertical tape measures are positioned in a predetermined location. The room has a camera embedded in the wall facing the customer and another camera embedded in a wall facing one side of the customer. The walls facing the cameras are imprinted with a grid that indicates height and width dimensions. The cameras are triggered simultaneously. Afterward, the customer removes and disposes of the strips of measuring tape. The resulting front view and side view photographs are then either physically or electronically conveyed to an expert at a clothing manufacturing facility who inputs a predetermined set of sizing data to an integrated computer that controls the operation of machinery for the cutting, sewing, and other processes involved in the fabrication of a custom fitted article of clothing for the customer.

13 Claims, 8 Drawing Sheets

METHOD OF MEASURING BODY MEASUREMENTS FOR CUSTOM APPAREL MANUFACTURING

CROSS-REFERENCE TO RELATED APPLICATIONS

This application claims the benefit of U.S. Provisional application Ser. No. 60/055,200 filed Aug. 11, 1997.

BACKGROUND OF THE INVENTION

1. Field of the Invention

The present invention relates generally to the tailoring of clothing. More particularly, the present invention relates to a method for taking body measurements and an apparatus for performing the stated method.

2. Description of Related Art

It is very rare for the nearest standardized size of an article of clothing for sale from the rack of a clothing store to fit properly. One survey, cited in U.S. Pat. No. 5,548,519, issued to Sung K. Park on Aug. 20, 1996, for a custom apparel manufacturing apparatus and method, found that only two percent of the population is correctly fitted by an available standard sized article of clothing without any alteration. Consequently, any expense saved by purchasing mass produced clothing at a lower cost than custom tailored clothing is partially lost when a seamstress or tailor is paid to make alterations to the article of clothing.

Additionally, a salesperson typically marks the article of clothing prior to sending that article of clothing to a third party tailor or seamstress. With large numbers of salespeople, having unpredictable levels of training and going between a clothing customer and a seamstress or tailor, a widely variable additional degree of error reduces the accuracy of the alterations performed on the article of clothing purchased. Often, an article of new clothing must be sent back for additional alterations before an acceptable fitting is achieved. However, few clothing consumers can afford a completely customized, hand-tailored wardrobe. Even given two professional tailors having comparable levels of expertise taking measurements from the same customer, rarely are the sets of measurements the same. U.S. Pat. No. 5,163,007, issued to Halim Slilaty on Nov. 10, 1992, discusses these problems regarding a system for measuring custom garments wherein variations are reduced by utilizing an expert at a remote location to interpret sizing data from photographs. Thus, there is a need for a system that reduces subjective individual variations in obtaining clothing sizing data and simultaneously reduces the cost of producing custom fitted clothing.

Human labor is the most expensive element in the process of procuring new clothing that properly fits the customer. U.S. Pat. No. 4,598,376, issued to James O. Burton et al. on Jul. 1, 1986, describes this problem in a patent for a method and apparatus for producing custom manufactured clothing. Thus, there is a need for custom fitted clothing that reduces the amount of human labor from that required in the current state of the art.

It is recognized that certain contours of the body must be measured to achieve the most desirable fit for clothing. In the past, only highly trained professionals could obtain the necessary information about body shape. However, it costs money to obtain this requisite level of training, and more highly trained professional personnel are also more scarce than ordinary members of a sales staff. Both of these factors cause the use of highly trained professionals to obtain necessary fitting information increase the cost of the clothes thereby provided. U.S. Pat. No. 3,902,182, issued to Lars Evert Bernhard Hillborg on Aug. 26, 1975, describes this problem in a patent for a process and device for photographically determining dimensions of persons for fitting clothes. Thus, to the extent that professional human assistance is necessary to obtain custom fitting information, there is a need to reduce the level of expertise and training required to obtain that information.

It is also recognized that the larger the number of measurements taken from a customer's body, the better the fit of the clothing that is produced using those measurements. However, when body measurements are taken manually, the greater the number of the measurements taken, the greater the amount of time required from both the customer and the salesperson. This adds to the cost and inconvenience of obtaining custom fitted clothing. Thus, there is a need for a method of obtaining a large number of measurements from a clothing customer's body in a short period of time.

One approach to obtaining a large number of measurements from the human body of a clothing customer in a relatively short period of time is to photograph or videotape the body of the customer. Hillborg '182, and Slilaty '007, mentioned above, both disclose systems or processes for custom fitting clothing that obtain sizing information from images of the customer preserved on film. Similarly, the following patents also disclose systems, processes, and devices that obtain sizing information for custom fitted clothing from images of an apparel customer recorded on film: U.S. Pat. No. 3,089,244, issued to Annette Levy on May 14, 1963; U.S. Pat. No. 3,383,770, issued to James J. Xenakis on May 21, 1968; U.S. Pat. No. 4,885,844, issued to Joong H. Chun on Dec. 12, 1989; U.S. Pat. No. 5,163,006, issued to Michelle Deziel on Nov. 10, 1992; British Patent Number 855,101, published on Nov. 30, 1960; and European Patent Number 554,647, published on Jul. 17, 1996.

Assuming that an image is preserved on film to obtain measurements for the custom fitting of clothing, there are a number of ways to improve the number, type, or accuracy of the fitting measurements taken from the film. Two common approaches that aid in the gathering of accurate fitting measurements for customized clothing are the use of an article or articles of specialized fitting apparel and the use of a calibrated grid either on or around the person being photographed or filmed for sizing information. The following patents disclose the use of a grid on or around a custom clothing buyer, or the use of specialized fitting apparel, to assist in the process of gathering measurements of the human body for the purpose of making custom fitted clothing: U.S. Pat. No. 2,374,654, issued to Jessie Carlyle Cooke on May 1, 1945; U.S. Pat. No. 4,868,990, issued to Bernard J. Steinberg on Sep. 26, 1989; and, WIPO/PCT Patent Number 83/04366, published on Dec. 22, 1983. Levy '244, Chun '844, Hillborg '182, and GB '101, cited above, also disclose the use of a specialized grid on or around the customer, or the use of specialized fitting apparel, to assist in the process of gathering measurements of the human body for the purpose of making custom fitted clothing. Furthermore, Soviet Patent Number 1,553,041, published on Mar. 30, 1990, discloses the use of a grid adapted to a dummy for the purpose of designing custom fitting clothing.

In the modern technological age, one way to capitalize on sizing information obtained from an image of an apparel customer recorded on film is to input that sizing information as data to an integrated computer system that controls machinery which cuts and fabricates an article of apparel. The need for the use of computerized integrated systems in textile and clothing manufacturing facilities to process fabric, fitting, and measurement information, and to control the operation of cutting and sewing machinery is well-known to reduce the cost of producing custom fitted clothing. Computerized integrated systems are widely used for cutting fabrics and for sewing clothing. In addition to Burton '376, cited above, the following Patents, and the Patents incorporated therein by reference, describe computerized controls and data processing systems that operate in conjunction with clothing manufacturing, marking, and cutting machinery and processes: U.S. Pat. No. 4,853,866, issued to Mario Andrada Galan et al. on Aug. 1, 1989; U.S. Pat. No. 5,487,011, issued to Craig L. Chaiken on Jan. 23, 1996; U.S. Pat. No. 5,495,568, issued to William C. Beavin on Feb. 27, 1996; U.S. Pat. No. 5,508,936, issued to Thomas King et al. on Apr. 16, 1996; and, European Patent Number 302,843, published on Feb. 8, 1989.

Another approach known in the art is the use of a computer integrated adjustable sheath that fits over the body of the human clothing customer who is being fitted. Soviet Patent Number 784,860, published on Feb. 28, 1979, discloses an adjustable sheath for fitting which directly inputs measurement data to an integrated logic circuit for processing.

None of the above inventions and patents, taken either singly or in combination, is seen to describe the instant invention as claimed.

SUMMARY OF THE INVENTION

The present invention is a tailoring system and apparatus for tailoring clothing wherein body measurements are photographically recorded for computer data entry from special form fitting articles of clothing to which disposable strips of tape measures are temporarily adhesively affixed.

Before being weighed, a customer puts on a specially designed body suit consisting of a top, a specially designed sleeve, and a specially designed leg leotard. A sales assistant then helps the customer temporarily attach specially designed disposable strips of measuring tape to predetermined circumferential portions of the top, the sleeve, and the leg leotard. The strips of measuring tapes are temporarily attached by small pieces of a double sided adhesive tape designed to come off with the strips of measuring tape when they are removed and not stick to the top, the sleeve, or the leg leotard.

The customer then stands on an elevated platform in the corner of a specially designed room. A hand rail is available for balance if necessary, and a mirror is provided whereby the customer views his or her appearance while standing on the platform. The room has a front camera embedded in a front wall facing the customer and a side camera embedded in a side wall facing one side of the customer. In the vicinity of the corner where the customer is standing on the platform, a second side wall opposite the side camera is imprinted with vertical lines and a back wall opposite the front wall is imprinted with a grid having both vertical and horizontal lines.

In the preferred embodiment, the platform has a pair of linear grooves near its left and right edges. A pair of linear tracks are near a ceiling in the room directly above the grooves. A pair of tape housings are slidably mounted in the tracks. Sliding motion of the tape housings within the tracks is achieved through the use of a draw string. Retractable tape measures are contained within the tape housings.

Once the customer is standing on the platform, the sales assistant pulls the draw string until the tape housings are the same distance from the front of the platform as the customer. In other words, the sales assistant aligns the tape housings with the customer. The sales assistant then extends the retractable tape measures down vertically to the grooves and fastens the retractables tape measures in the grooves.

In an alternative embodiment, the grooves, tracks, tape housings, vertical tape measures, and draw strings are omitted, and the vertical lines and the grid are calibrated for parallax from the lens of the cameras to indicate height and width dimensions of the customer.

The sales assistant then triggers a single exposure on each of the cameras simultaneously. Afterward, the customer removes and disposes of the strips of measuring tape and attached pieces of double sided adhesive tape.

The resulting front view and side view photographs are then either physically or electronically conveyed to an expert at a clothing manufacturing facility who inputs a set of predetermined dimensional data that represent the fitting measurements of the customer to an integrated computer. Using this sizing data, the computer then modifies a garment fabrication program on record for the article of clothing being fabricated and controls the operation of machinery for the cutting, sewing, and other processes involved in the fabrication of a custom fitted article of clothing for the customer.

Accordingly, it is a principal object of the invention to provide custom tailored clothing having a better fit at a lower cost than previously possible with less inconvenience to the customer than previously possible in similar inventions.

More specifically, it is an object of the invention to reduce the amount of human labor required to provide custom tailored clothing while simultaneously increasing the consistency and number of measurements taken from each customer by obtaining sizing information from a photograph of the customer.

Thus, a related object of the invention is to obtain a large number of measurements from a clothing customer's body in a short period of time and to input this information as data to an integrated computer system that controls machinery which cuts, sews, and fabricates an article of apparel to the customized specifications of that particular human body.

It is a further object of the invention to provide a grid in the photographic background of the customer being fitted for clothing, the grid for increasing the amount of sizing measurements, that can be obtained from the photograph.

Still another object of the invention is to reduce the potential for measuring errors due to subjective differences from one individual to another or due to unpredictably variable levels of training by providing a low number of equally trained experts at a central manufacturing facility and by reducing the level of subjective professional judgment and training required of sales and service personnel who deal directly with the customer at a retail, wholesale, or other sales location.

A still further object of the invention is to provide a specialized type of fitting garment that aids in the process of obtaining body measurements for the purpose of producing custom fitting clothing.

A related object of the invention is to conveniently provide disposable tape measures and a disposable adhesive for affixing the disposable tape measures to a specialized fitting garment in a manner that the tape measures are visible in a photograph of the customer who is being fitted.

Thus, it is an objective of the invention to reduce the overall level of expertise and training required to obtain the sizing information necessary to produce custom fitted articles clothing.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a photographic method of measuring for use by tailors and an apparatus for use in such photographic method. The purpose of the invention is to obtain detailed information about the dimensions of the body of a customer 10 from photographs of the customer 10, the information being input by a trained expert at a manufacturing facility as data into an integrated, computer controlled system for operating the machinery used in a manufacturing process for fabricating a custom fitted article of clothing. The present invention dramatically reduces the cost of providing custom fitted clothing to the customer 10. In order to provide necessary background, the apparatus of the present invention will be described in detail before the method of the present invention is described. However, references must the made to some of the steps of the method of the present invention while describing the apparatus of the present invention.

Figure 1A:
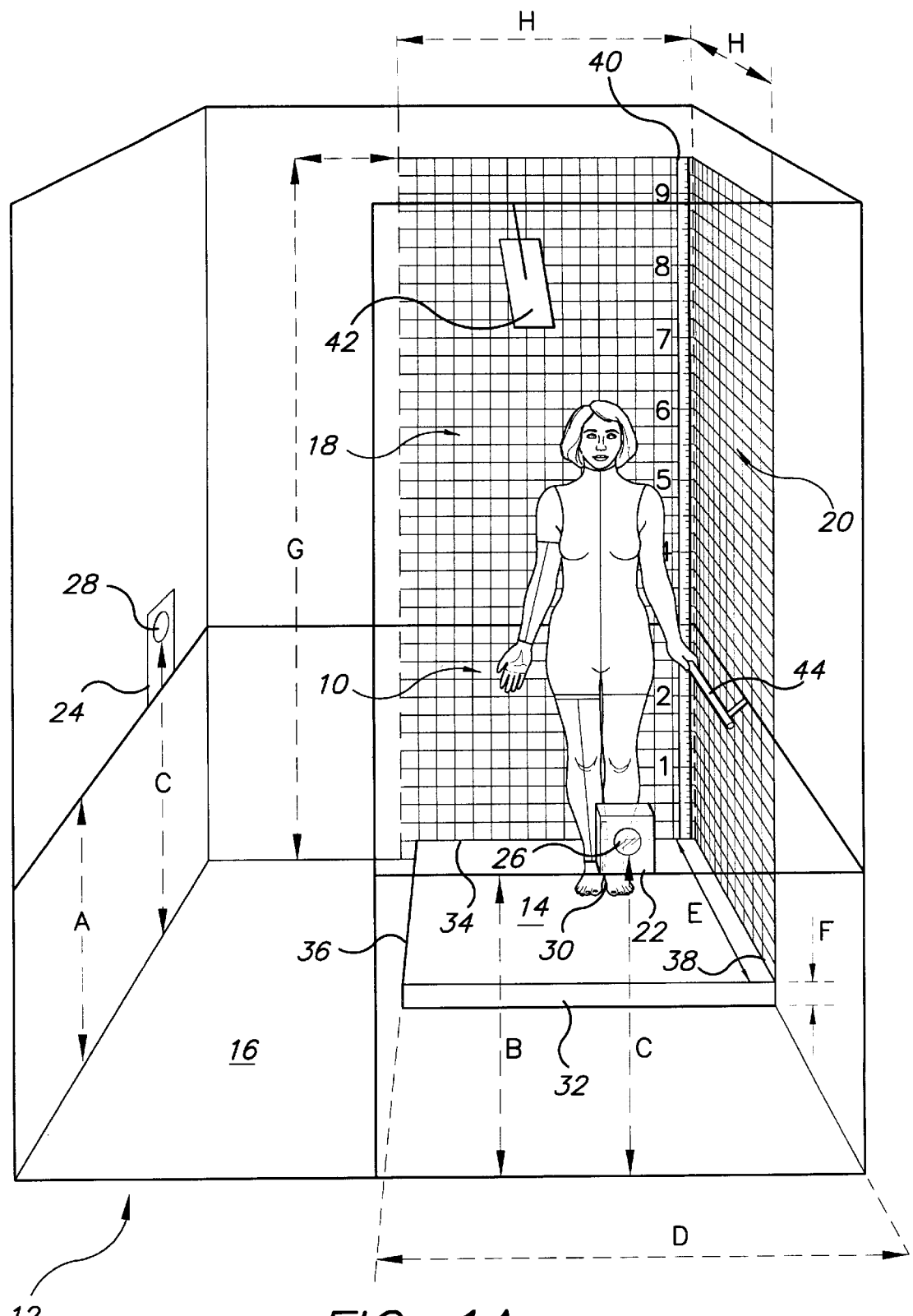
FIG. 1A is a large environmental perspective view of the photographic room, including the cameras and walls, for use with the method of measuring for tailors according to the present invention.

Referring to FIG. 1A, the customer 10 is shown in a room 12. The room 12 is located within an establishment that sells clothing. For example, it is suggested that an ideal location for the room 12 is next to, or in the vicinity of, a changing room that is typically found in an establishment that sells clothing. The customer 10 represents any person, male or female, young or old, who desires to own a properly fitted article of clothing. The customer 10 illustrated is a fully developed woman of average age; however, the present invention also functions well when the customer is a man, small, such as a child, large, such as the typical "big and tall" shopper, or a senior citizen.

The customer 10 is shown standing on a platform 14 which is elevated above a floor 16 inside the room 12. The platform 14 has a front edge 32, a rear edge 34, a side camera edge 36, and a side grid edge 38. Behind the customer 10, adjacent to the rear edge 34, is a rear grid 18. To one side of the customer 10, adjacent to the side grid edge 38, is a side grid 20. The rear grid 18 is situated to serve as a backdrop when the customer 10 is photographed by a front camera 22. The front camera 22 faces the front edge 32 of the platform 14. Similarly, the side grid 20 is situated to serve as a backdrop when the customer 10 is photographed by a side camera 24 facing the side camera edge 36. In the preferred embodiment, the front camera 22 and the side camera 24 are in a fixed position. This insures the uniform use of the present invention.

FIG. 1A shows one embodiment of present invention. In the embodiment pictured, the elevation F of the platform 14 above the floor 16 is engineered so that the line of sight from a front lens 26 of the front camera 22 to the bottom of the rear grid 18 and the line of sight from a side lens 28 of the side camera 24 to the bottom of the side grid 20 intersect at a pose spot 30 on the platform 14. In order to properly measure the customer 10, the customer 10 stands on the platform 14 at the pose spot 30. A permanent marker such as a colored dot or a dark X is located on the platform 14 indicating the position of the pose spot 30. In the preferred embodiment, the pose spot 30 consists of a series of concentric phantom outlines of a pair of feet having a range of sizes indicating the position of the customer's 10 feet on the platform 14.

In this embodiment, the rear grid 18 and the side grid 20 are calibrated to indicate height and width dimensions of the customer 10 standing erect on the pose spot 30. This requires that, unlike the preferred embodiment, the actual dimensions of the rear grid 18 and the side grid 20 do not correspond exactly to the indicated dimensions. For any indicated unit of height, the actual dimension higher or lower on the rear grid 18 and the side grid 20 is greater than the actual dimension for that unit of height on the grid 18, 20 at the level of the opposing lens 26, 28. Similarly, for any indicated unit of width, the actual dimension further to the left or the right on the grid 18, 20 is greater than the actual dimension for that unit of width on the grid 18, 20 opposite the lens 26, 28. Thus, all height and width dimensions of the customer 10 are read accurately and without further calculation from a photograph taken of the customer 10 while the customer 10 is standing erect on the platform 14 at the pose spot 30.

Figures 1B, 1C:
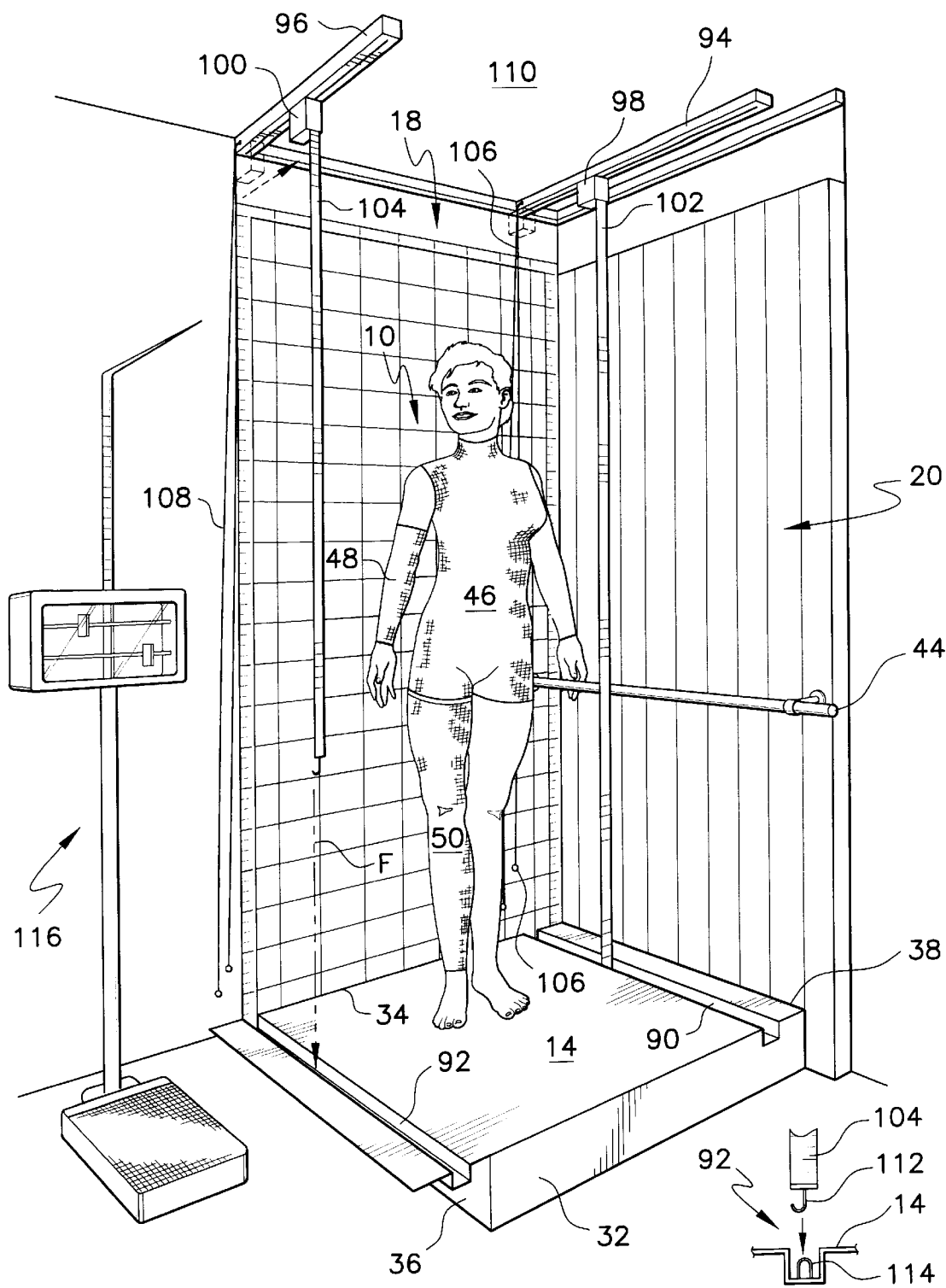
FIG. 1B is an environmental perspective view of the photographic room, on a smaller scale excluding the cameras, for use with the method of measuring for tailors according to the present invention.
FIG. 1C is a fragmented side plan view of the groove and the vertical tape measure of the photographic room for use with the method of measuring for tailors according to the present invention.

In the preferred embodiment, shown in FIG. 1B, the need to calibrate the rear grid 18 and the side grid 20 for parallax is eliminated. This preferred embodiment includes a left groove 90, a right groove 92, a left track 94, a right track 96, a left tape housing 98, a right tape housing 100, a left vertical tape measure 102, a right vertical tape measure 104, a left draw string 106, and a right draw string 108, none of which is included in the first embodiment shown in FIG. 1A.

The draw strings 106, 108 are connected to the tracks 94, 96. When the draw strings 106, 108 are pulled, the tape housings 98, 100 slide along the tracks 94, 96. The tracks 94, 96, and the grooves 90, 92 are all linear and parallel. The left track 94 is directly over the left groove 90 near a ceiling 110 in the room 12. Similarly, the right track 96 is directly over the right groove 92 near the ceiling 110. The grooves 90, 92 should be near the side camera edge 36 and the side grid edge 38 of the platform 14 so as not to interfere with the feet or balance of the customer 10 as the customer 10 mounts and dismounts the platform 14.

The vertical tape measures 102, 104 are coiled within the tape housings 98, 100 when at rest, thus defining a retracted position. However, the vertical tape measures 102, 104 extend beyond the tape housings 98, 100 when a downward force is applied to the vertical tape measures 102, 104, as indicated in FIG. 1B by broken arrow F. The vertical tape measures 102, 104 are spring loaded so that they return to the retracted position whenever a downward force is not being applied to the vertical tape measure 102, 104.

Additionally, the vertical tape measures 102, 104 must be long enough to extend downwardly from the tracks 94, 96 to the grooves 90, 92 below. It is recommended that the vertical tape measures 102, 104 be more than one hundred inches long and have at least one hundred markings spaced one inch apart. The markings on the vertical tape measures 102, 104 must be visible and distinguishable when viewed from the position of the front lens 26. The tracks 94, 96 must be near the edges 36, 38 so that the vertical tape measures 102, 104 do not interfere with the customer 10 when the vertical tape measures 102, 104 are extended downwardly from the retracted position.

The preferred construction of the vertical tape measures 102, 104 is a flexible metal; however, a flexible woven fabric or other material known to be suitable for use as a tape measure is also acceptable. Additionally, in the preferred vertical tape measure 102, 104, the only means to extend the tape measure 102, 104 downwardly is the manual application of a downward force. However, in the alternative, a mechanical drive mechanism automatically extends the vertical tape measures 102, 104 down from the tape housings 98, 100 toward the grooves 90, 92. It is believed that the present invention is simpler to operate, easier to maintain, and just as convenient to use without providing a mechanical drive mechanism to automatically move the vertical tape measures 102, 104 from the retracted position down toward the grooves 90, 92.

An end of the right vertical tape measure 104 and a cross section of the right groove 92 are shown in FIG. 1C. A hook 112 is attached at the end of the right vertical tape measure 104, and a loop 114 is attached to the bottom of the right groove 92. When the right vertical tape measure 104 is fully extended, the hook 112 temporarily attaches under the loop 114, thus securing the right vertical tape measure 104 in an extended position. When the hook 112 is unattached from the loop 114, the right vertical tape measure 104 returns to the retracted position.

A view showing an end of the left vertical tape measure 102 and a cross section of the left groove 90 would appear identical to FIG. 1C. Thus, a hook 112 at the end of the left vertical tape measure 102 temporarily fastens under a loop 114 in the left groove 90 when the left vertical tape measure 102 is in the extended position, as shown in FIG. 1B.

An array of loops 114 traverses the length of the grooves 90, 92, from one end to another with a loop 114 affixed to the bottom of the grooves 90, 92 every inch. In this manner, the vertical tape measures 102, 104 are temporarily fastened in the extended position perpendicularly to the platform 14 and the grooves 90, 92, regardless of the position along the length of the tracks 94, 96 where the tape housings 98, 100 are located. For the purposes of the method of the present invention, it is important that the vertical tape measures 102, 104 are temporarily secured to the grooves 90, 92 fully vertically when the vertical tape measures 102, 104 are in the extended position. To assist in determining which loop 114 is directly vertically beneath the location of the tape housing 98, 100 in the track 94, 96 above, the loops are numbered and the tracks are similarly numbered such that a loop of a given number is directly vertically beneath a location along the length of the track 94, 96 bearing the same number.

Figure 7:
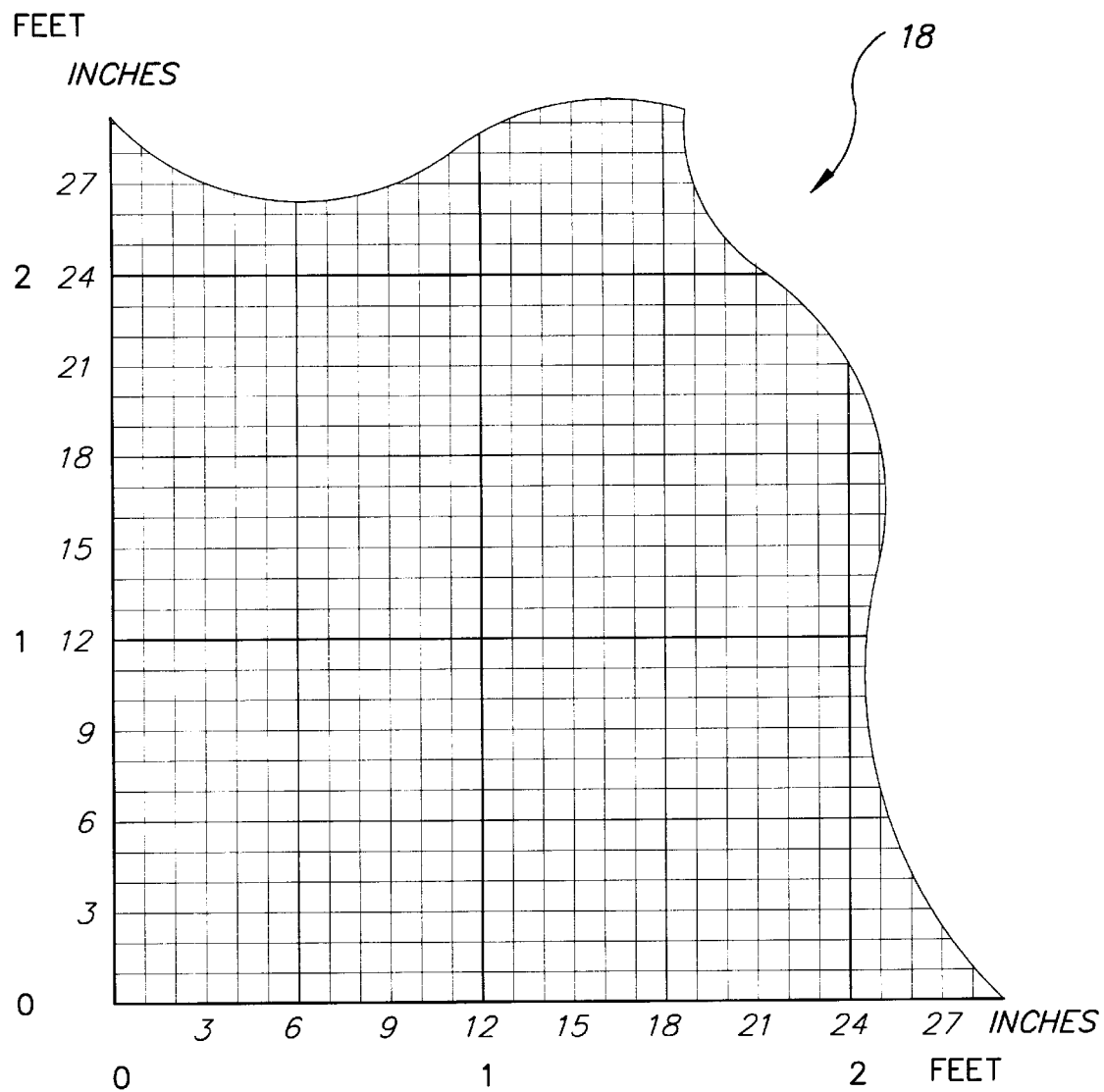
FIG. 7 is a fragmented plan view on a larger scale of the rear grid of the photographic room for use with the method of measuring for tailors according to the present invention.

In order to assist in reading dimensions from the rear grid 18 and the side grid 20, it is recommended that larger blocks of a predetermined size be shaded darker than the smaller grid blocks from which the larger block is composed. For example, if each block in a grid 18, 20 is one square inch, then it is recommended that each square foot be shaded darker than the square inches within. Similarly, if each block in a grid 18, 20 measures two centimeters by two centimeters, then it is recommended that grid blocks measuring ten centimeters by ten centimeters are shaded darker. FIG. 7 illustrates the preferred embodiment of the rear grid 18 in accordance with this principle.

In the preferred embodiment, the side grid 20 consists only of vertical lines. In other words, the horizontal lines present in the rear grid 18 are deleted from the side grid 20 in the preferred embodiment. The purpose for this difference will be explained in detail later. Nonetheless, it should be noted that the horizontal lines are included in an alternative embodiment of the side grid 20 as illustrated in FIG. 1A.

In the first embodiment, pictured in FIG. 1A, a ruled scale 40 is provided to label the dimensions indicated by the lines in the grids 18, 20. As pictured, the ruled scale 40 is a long yardstick fastened to the rear grid 18. In an alternative embodiment, the ruled scale 40 is printed directly onto the grids 18, 20. The units of dimension numbered on the ruled scale 40 should be selected to correspond to the units of measurement standard in the local garment industry. Feet and inches are the recommended units of measurement for use on the ruled scale 40 in the United States. If a yardstick is used for the ruled scale 40 on the rear grid 18 as pictured, then a similar or identical yardstick should be fastened to the side grid 20.

The addition of the vertical tape measures 102, 104 in the preferred embodiment eliminates the need for the ruled scale 40 on the rear grid 18. For other reasons, discussed in greater detail within, the ruled scale 40 is omitted from the side grid 20 also in the preferred embodiment. Yet another embodiment includes both the vertical tape measures 102, 104 and the ruled scale 40; however, it is believed that the use of both the ruled scale 40 and the vertical tape measures 102, 104 might lead to confusion as to the correct measurements and dimensions.

In order to insure that the grids 18, 20 will read accurately for the largest possible customer 10, it is recommended that the height G of the grids 18, 20 be at least seven feet, and the width H of the grids 18, 20 be at least three feet. In the preferred embodiment, the grids 18, 20 are ninety inches high and forty inches wide.

To minimize the magnitude of the effect of parallax at the extreme edges of the grids 18, 20, it is preferable that the lenses 26, 28, be located opposite a central location on the grids 18, 20. Thus, in the preferred embodiment, the height C of the lenses 26, 28 above the floor 16 is forty inches, the distance of the lenses 26, 28 from the grids 18, 20 is ninety-two inches, and the elevation F of the platform 14 above the floor 16 is two and three-eighths inches. The same orientation of the lenses 26, 28 with respect to the grids 18, 20 is recommended in the preferred embodiment even though parallax is not a consideration in that embodiment.

Note that it may be necessary for the customer 10 to stand further away from the grids 18, 20 than indicated by the pose spot 30 when the customer 10 is particularly heavy set. Should the customer 10 not stand on the pose spot 30, the direct readings from the grids 18, 20 behind the customer 10 will not be accurate. The invention remains functional nonetheless as will be discussed below in greater detail. Alternatively, in another embodiment the dimensions of the room 12, the platform 14, and the grids 18, 20 are increased in conformity with the above stated principles. In this larger embodiment of the present invention, the pose spot 30 is located further away from the grids 18, 20, thus enabling even the largest customer 10 to stand on the pose spot 30.

The preferred embodiment is designed to eliminate these problems because no predetermined pose spot 30 is needed in the preferred embodiment. When using the embodiment pictured in FIG. 1B, the present invention compensates for differences in the location of the customer's pose on the platform 14 through an adjustment of the location of the vertical tape measures 102, 104 by sliding the tape housings 98, 100 through the tracks 94, 96.

Three other features of the room 12 are a mirror 42, a handle 44, and a trigger (not shown). The mirror 42 is provided so that the customer 10 may view his or her appearance when standing on the platform 14. It is important that the mirror 42 not interfere with the line of sight from the front lens 26 or the side lens 28. Thus, the mirror 42 is pictured above the front camera 22.

The handle 44 is provided to stabilize the balance of the customer 10. If the customer 10 is feeling unsteady, or if doing so makes the customer 10 feel more comfortable, the customer 10 grasps the handle 44 for support. In order to provide adequate support to the customer 10, the handle 44 must be securely anchored. Furthermore, it should be apparent that the handle 44 is positioned in the vicinity of the hand of a customer 10 of ordinary build. In an alternative embodiment not shown, multiple handles 44 are provided at various heights for the convenience of a wide variety of customers 10.

The trigger is designed to cause a front photograph (not shown) from the front camera 22 and a side photograph (not shown) from the side camera 24 to be taken simultaneously. If the side camera 24 and the front camera 22 are not triggered at the same time, it becomes more difficult to interpret body measurements of the customer 10 from the resulting photographs. Thus, a button, a switch, or any other known means of triggering the shutter of a camera is provided to simultaneously expose a frame of film in the front camera 22 and the side camera 24.

Yet another feature provided in an embodiment of the room 12 is a concentration point (not shown). The concentration point is a spot or some other visible marking directly in front of the pose spot 30 elevated to eye level for a person of average height. As with the mirror 42, the concentration point must not interfere with the line of sight from the front lens 26 or the side lens 28. As will be discussed in greater detail below, the accuracy of the present invention to measure the customer 10 is improved when the customer 10 stands on the pose spot 30 with an erect posture square to the front camera 22. The concentration point and the handle 44 aid the customer 10 to achieve the desired posture. Similarly, when using an embodiment of the present invention without a pose spot 30 or a concentration point, the customer should stand as erect and upright as possible when posing for the photographs.

Figure 5:
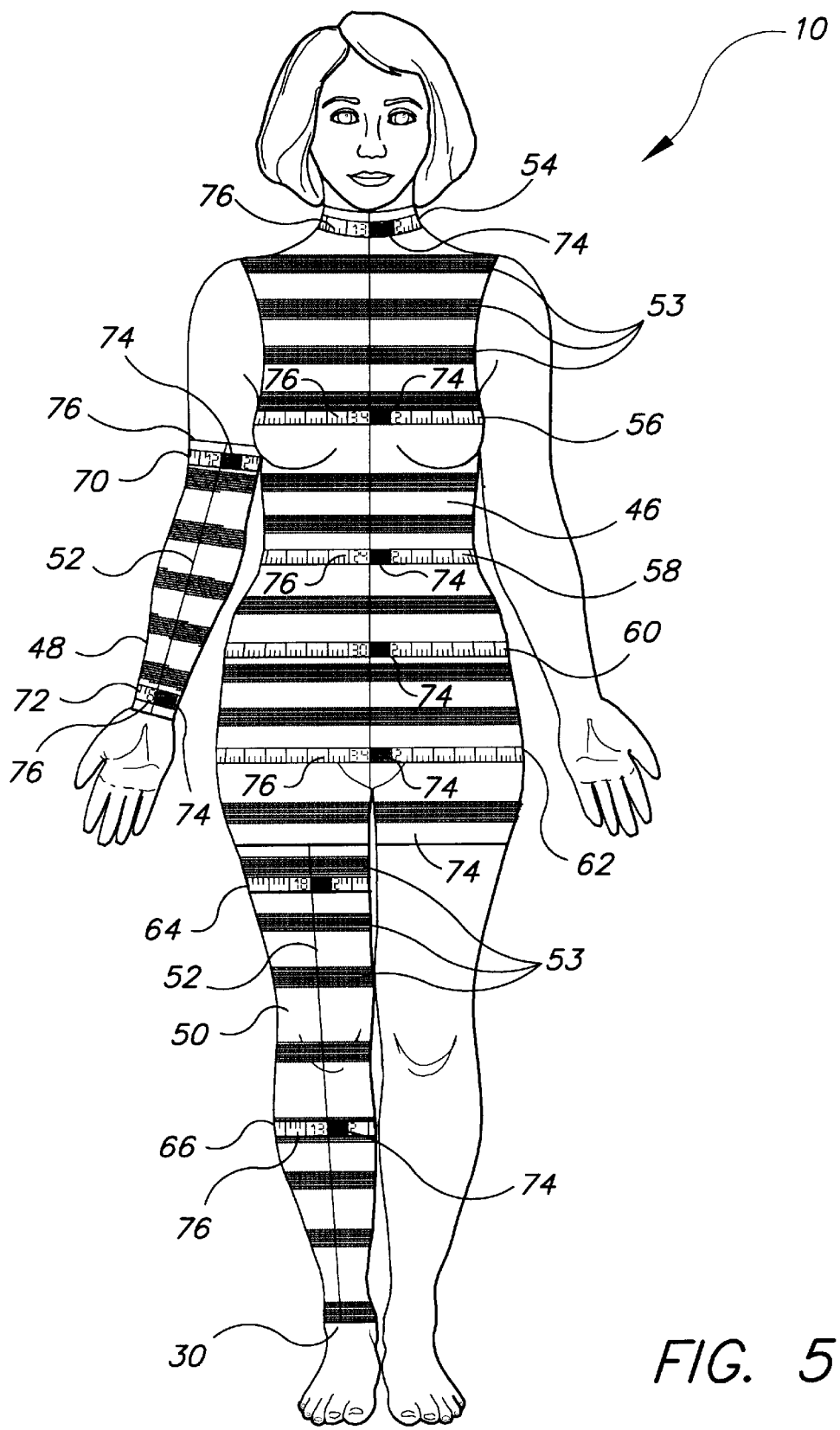
FIG. 5 is a front view of a model wearing the clothing and the measuring tapes for use in the photographic method of measuring for tailors according to the present invention.

Referring now to FIG. 5, the customer 10 is shown in greater detail. The customer 10 is wearing a top 46, a sleeve 48, and a leg leotard 50. Collectively, the top 46, the sleeve 48, and the leg leotard 50 are referred to as the body suit. The body suit is form fitting; that is, the top 46, the sleeve 48, and the leg leotard 50 closely fit the contours of the customer's 10 body. In order to obtain accurate sizing measurements of various parts of the body of the customer 10, it is important that the form of the customer's 10 body not be hidden by the body suit.

In the preferred embodiment, the body suit is fabricated from a blend of cotton and Spandex and is available in ten different standard sizes. The body suit is machine washable and reusable. Thus, if the customer 10 wishes to be remeasured in the future, the customer 10 reuses the body suit from a previous occasion. A body suit fabricated from a thick material adds more to circumferential measurements of the body than a body suit fabricated from a thin material. Therefore, in order to keep circumferential measurements of the body as accurate as possible, it is recommended that the body suit be fabricated from a thin material.

The top 46, the sleeve 48, and the leg leotard 50 each have a center line 52 facing the front camera 22. Five strips of a disposable, flexible tape measure are temporarily circumferentially attached to the top 46 at the customer's neck, bust, waist, upper hips, and lower hips. These are known respectively as the neck tape measure 54, the bust tape measure 56, the waist tape measure 58, the upper hips tape measure 60, and the lower hips tape measure 62. When the customer 10 is a man or a child, a tape measure is temporarily circumferentially attached at the chest in lieu of the tape measure that is used for the bust measurement of a mature woman. Thus, the bust tape measure 56 is referred to interchangeably as the chest tape measure.

Two strips of the disposable, flexible tape measure are temporarily, circumferentially attached to the leg leotard 50 at the customer's thigh and calf. These are known respectively as the thigh tape measure 64 and the calf tape measure 66. Finally, two strips of the disposable, flexible tape measure are temporarily, circumferentially attached to the sleeve 48 at the customer's biceps and wrist. These are known respectively as the biceps tape measure 70, and the wrist tape measure 72. Collectively, the neck tape measure 54, the bust tape measure 56, the waist tape measure 58, the upper hips tape measure 60, the lower hips tape measure 62, the thigh tape measure 64, the calf tape measure 66, the biceps tape measure 70, and the wrist tape measure 72 are referred to as the tape measures 54–72.

Generally, each tape measure 54–72 is positioned horizontally planar. However, it is often more convenient for the bust (chest) tape measure 56 to be one-half inch to one inch higher in the back than in the front of the customer 10. Similarly, the neck tape measure 54 is one inch higher at the nape of the customer's 10 neck than at the front of the customer's 10 neck. Thus, for the typical customer 10, eight of the ten tape measures 54–72 are horizontally planar. Occasionally, depending on the body shape of the customer 10, the waist tape measure 58 will be higher in the back than in the front. When this is the case, seven of the ten tape measures 54–72 are horizontally planar.

Each article of body suit has a series of wide stripes 53 that extend circumferentially around the article of body suit perpendicular to the center line 52. The wide stripes 53 are horizontally planar. Thus, the wide stripes 53 are designed to serve as a visual aid when applying the tape measures 54–72 so that the tape measures 54–72 are properly horizontally planar. If it feels more comfortable, the bust (chest) tape measure 56, the neck tape measure 54, and the waist tape measure 58 deviate from the horizontally planar lines demarcated on the top 46 by the wide stripes 53. In the preferred embodiment, the wide stripes are two inches wide and are separated from each other by two inches per stripe. Further, it is recommended that the space separating the wide stripes be of a color that contrasts with the stripes. Contrast between the stripes on the body suit assists in the identification of body parts. Finally, it is also recommended that the crotch of the top 46 have a darkly contrasting color. Seams joining many panels of fabric in an article of clothing typically come together at the crotch. Therefore, heightened contrast in the area of the crotch aids in the manufacturing of an article of clothing.

A measuring scale 76 is visible on each tape measure 54–72 providing a visual indication of the ten circumferential dimensions the tape measures 54–72 designate. When properly placed on the body suit, the tape measures 54–72 begin at the center lines 52 and measure circumferentially from left to right. Thus, the circumferential measurement information is discernable from the front photograph just to the left of the center lines 52. In the preferred embodiment, the first two inches of each tape measure 54–72 is a dark colored block 74. The dark colored blocks 74 are designed to aid in differentiating the end of the tape measure 54–72 from the beginning of the tape measure 54–72 when viewing the front photograph through the use of increased contrast.

In the preferred embodiment, the tape measures 54–72 have a white background on which a measuring scale is printed in clearly visible black ink. Like the dark colored blocks 74, the use of a bold black ink on a crisp white background in the tape measures 54–72 maximizes the contrast thus improving the readability of the body measurements on the customer 10.

Figure 6A:
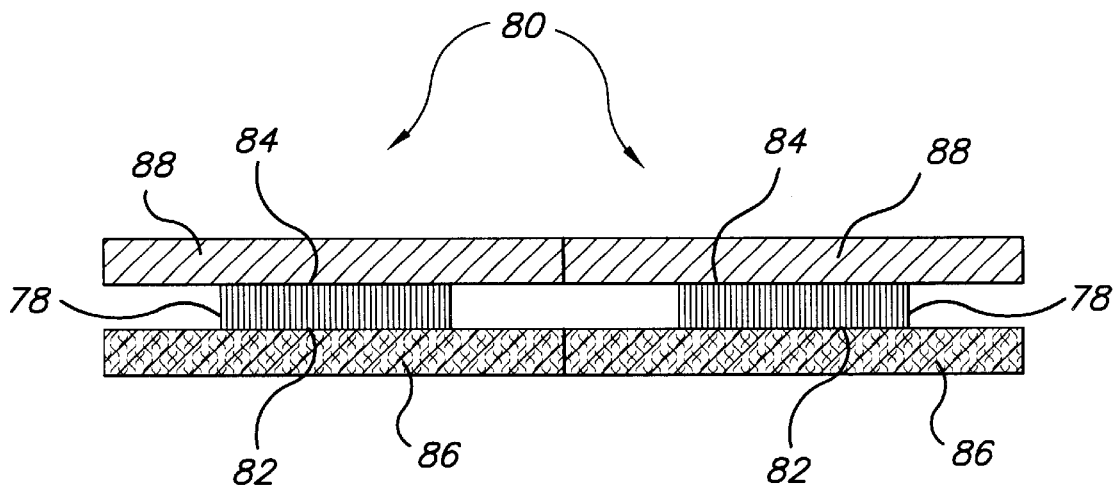
FIGS. 6A to 6C are side, top, and front views respectively of two unrolled segments of the adhesive tape used to adhere the measuring tapes to the clothing as shown in FIG. 5.
Figure 6B:
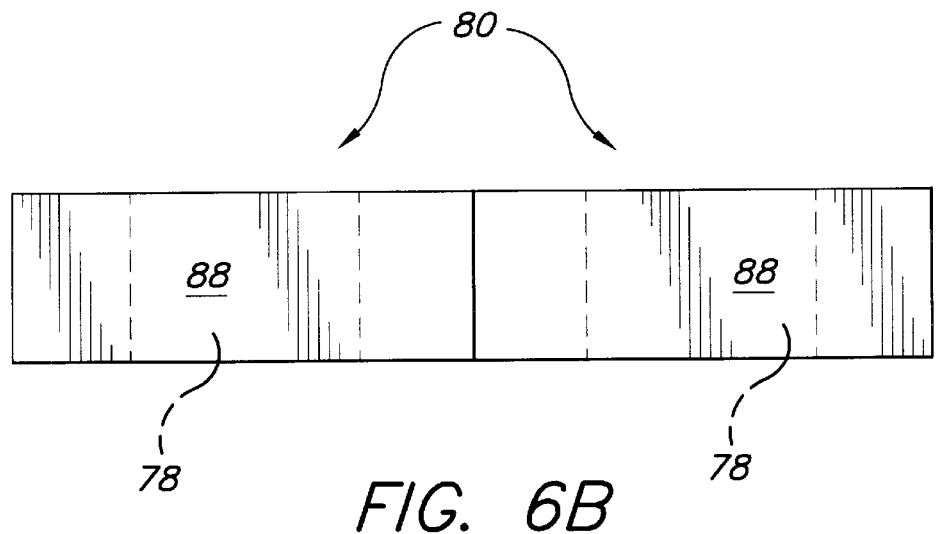
Figure 6C:
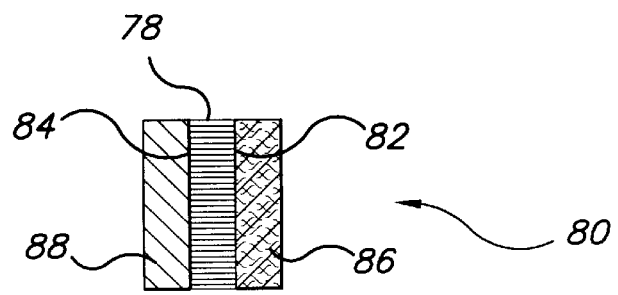

In the preferred embodiment, the tape measures 54–72 are paper strips of seven different lengths dispensed from a roll. The different lengths of the paper strips in the preferred embodiment are predetermined to correspond to the relative differences generally found in the various circumferential measurements taken from the customer 10. The lengths of the paper strips of the preferred embodiment are thirty, fifty, seventy, ninety, one-hundred and ten, one-hundred and thirty, and one-hundred and fifty centimeters. The paper tape measures 54–72 of the preferred embodiment are temporarily affixed to the body suit by a series of small pieces of two-sided adhesive tape 78. Like the tape measures 54–72, the pieces of two-sided adhesive tape 78 also come in a roll. Referring to FIG. 6, two segments 80 from a roll of pieces of two sided adhesive tape 78 are shown in a side view (FIG. 6A), a top view (FIG. 6B), and a front view (FIG. 6C).

Each piece of two-sided adhesive tape 78 has a strong adhesive side 82 and a weak adhesive side 84. It is to be understood that the relative relationship of the sides of the adhesive tape, i.e. the sides are stronger and weaker, is the focus of the invention. When affixing the tape measures 54–72 to the body suit, the strong adhesive side 82 faces the tape measure 54–72 and the weak adhesive side 84 faces the body suit. Thus, when the tape measure 54–72 is removed from the body suit, the pieces of two-sided adhesive tape 78 are also removed from the body suit.

Each segment 80 from the roll consists of one piece of two-sided adhesive tape 78, a strong side protective release liner 86, and a weak side protective release liner 88. The release liners 86, 88 have a different color, a different pattern, or some other means of differentiating the strong side release liner 86 from the weak side release liner 88 such as the use of written labeling. Each segment 80 is detachable from the next segment 80 in the roll. This is accomplished through the use of perforations or some other means of weakening the bond between the release liners 86, 88 from segment 80 to segment 80.

In the preferred embodiment, each piece of two-sided adhesive tape 78 is one-half of an inch long and three-eighths of an inch wide. The protective release liners 86, 88 are three-eighths of an inch wide and three-quarters of an inch long, leaving one-half of an inch separating each piece of tape 78 between the release liners 86, 88 in the roll. The tape measures 54–72 are five-eighths of an inch wide in the preferred embodiment.

Some of the steps in the method of the present invention were described above within the detailed description of the apparatus of the present invention. The method of the present invention will now be described more thoroughly.

Initially, the establishment provides the body suit to the customer 10. It is recommended that the establishment sell the body suit to the customer 10 at a wholesale, non-profit, or cost price. The clothing establishment stocks about nine standard sizes of the body suit in addition to a few sample sizes, colors, and patterns of each style of clothing available for sale in conjunction with the present invention. Thus, the inventory of the clothing establishment is dramatically reduced by the present invention. This in turn lowers a source of significant overhead conventionally present in the apparel industry today. After purchasing the nearest standard size of the body suit, the customer 10 removes the clothes the customer 10 wore to the establishment and puts on the body suit. Many customers 10 may feel uncomfortable wearing the body suit publicly. Thus, it is recommended that the room 12 be screened by a curtain or otherwise concealed for the privacy of the customer 10.

Next, the customer 10 is weighed by a sales representative of the clothing establishment on a weighing scale 116. The sales representative makes a record of the customer's 10 weight to accompany the customer's 10 clothing order. Weighing the customer 10 protects the clothing establishment from fraud or bad faith dealings by the customer 10. For example, if the customer 10 ordered an article of clothing through the use of the present invention, and proceeded to gain or lose a lot of weight before returning to pick-up the completed article of clothing, the customer 10 might unethically demand a refund on the ground that the establishment made an error in measuring the customer 10 or in fabricating the article of clothing. Having the customer's 10 weight at the time the customer 10 places an order on record enables the clothing establishment to determine whether or not a poor fit is caused by subsequent weight gain or weight loss by the customer 10. It is believed that the clothing establishment should keep the customer's 10 weight confidential under applicable law or conventional courtesy regarding the customer's 10 right to privacy.

In the preferred embodiment, the sales representative weighs the customer 10 on a weighing scale 116 common to the medical profession. It is recommended that the sales representative have the customer 10 remove any footwear prior to weighing so that the customer 10 is barefoot when the sales representative weighs the customer 10 on the weighing scale 116.

After weighing the customer 10 and recording the customer's 10 weight, the sales representative tears segments 80 from the roll, removes the weak side release liner 88, and temporarily affixes a series of pieces of tape 78 to the body suit in a circumferential line around the neck, bust (chest), waist, upper hips, lower hips, thigh, calf, biceps, and wrist by the weak adhesive side 84. After the series of pieces 78 are affixed to the body suit, the sales representative removes the strong side release liner 86 from each piece 78 and adheres the tape measures 54–72 to the strong adhesive side 82 of each piece 78.

It should be apparent that an acceptable variation in this sequence is to adhere the tape measures 54–72 to the strong adhesive sides 82 of the series of pieces of the adhesive tape 78 one tape measure 54–72 at a time. In this variation, after the sales representative adheres the neck tape measure 54, the series of pieces of adhesive tape 78 are affixed to the bust (chest) 56, and so on.

In the preferred embodiment, the tape measures 54–72 are supplied on rolls of seven standard lengths ranging in twenty centimeter increments from thirty centimeters to one-hundred and fifty centimeters. Note, however, that the preferred measurement scale 76 on the tape measures 54–72 in the United States is inches.

When adhering a tape measure 54–72 to the shortest circumferential dimensions, typically the wrist tape measure 72, the tape measure 54–72 will generally be removed from the shortest roll, that is, the thirty centimeter roll. When using the paper tape measures 54–72 of the preferred embodiment, the sales representative simply tears away any excess greater than the actual circumferential measurement to which the tape measure 54–72 is applied.

The application of the tape measures 54–72 necessitates physical contact between the customer 10 and the sales representative. Sometimes, the customer 10 may feel that the physical contact with the sales representative is of a somewhat intimate nature. Therefore, it is recommended that the sales representative be a male when the customer 10 is a male and that the sales representative be a female when the customer 10 is a female.

Once the customer 10 is wearing the body suit with pieces of two-sided adhesive tape 78 holding the tape measures 54–72 in place, the customer stands on the platform 14 at the pose spot 30. The sales representative then asks the customer 10 to stand as erect, upright, and with shoulders as square as possible toward the front camera 22, and the sales representative actuates the trigger.

Sometimes, the customer 10 may be self conscious about their appearance. When the customer 10 wants to keep identity confidential, a hood or mask (not shown) is worn while standing on the platform 14. Wearing a hood or mask may interfere with the sense of balance of the customer 10. If the customer 10 has any concern regarding equilibrium while standing on the platform 14, the customer grasps the handle 44 for additional support.

Typically, the customer 10 will want to visually inspect their appearance before the sales representative actuates the trigger. The mirror 42 is provided to satisfy this desire. In the preferred embodiment, the mirror 42 is situated so that the customer 10 can view their reflection in the mirror 42 while standing on the platform 14. At the same time however, the mirror 42 must not interfere with the front photograph and the side photograph. Thus, the mirror 42 is not in the line of sight from the front lens 26 to the rear grid 18 or from the side lens 28 to the side grid 20.

After the sales representative simultaneously actuates the aperture in the front lens 26 and the side lens 28 with the trigger, creating the front photograph and the side photograph, the sales representative removes the tape measures 54–72 from the body suit. Since the strong adhesive side 82 of each piece of two-sided tape 78 faces the tape measures 54–72, the pieces of tape 78 are removed from the body suit when the tape measures 54–72 are removed. Once removed, the tape measures 54–72 and the pieces of tape 78 are discarded. From this point in the process, the customer 10 is not needed again until the final product is completed and delivered.

After producing the photographs, the sales representative conveys the photographs to a trained expert at a manufacturing facility. Any known means of conveying a photograph is acceptable. For example, in one embodiment the sales representative scans the photographs into a computer and conveys the photographs to the expert by a computer network connection or via the internest. Similarly, in another embodiment the sales representative faxes the photographs to the expert. In yet another embodiment, the sales representative conveys a hard copy of the photographs to the expert through a known courier such as the U.S. Postal Service, Federal Express, or United Parcel Service.

The customer 10 is likely to find quicker service more satisfactory. Thus, a means of conveying the photographs to the expert quickly is superior to a means of conveying the photographs that requires a delay. Also, a means of conveying photographs having good resolution is superior to a means of conveying photographs having poor resolution. Thus, the use of a fax machine to convey the photographs to the expert is not recommended unless the fax machine possesses superior resolution.

After conveying the photographs to the trained expert, the sales representative's role in the method of the present invention has substantially ended. Before describing the subsequent steps in the method of the present invention, it is important to note that very little training or expertise is required of the sales representative by the present invention. By providing a chart for the sales representative, the chart being similar in appearance to FIG. 5, and a simple set of instructions, no expertise is needed in the sales representative beyond the ability to attach the tape measures 54–72 to the body suit and actuate the trigger. No more than one day of training is necessary to fully equip the sales representative for the use of the present invention.

It is believed that by minimizing the training and expertise required of the sales representative at the clothing establishment, the present invention significantly reduces an important overhead cost generally present in the garment industry today. By isolating the expert at the manufacturing facility, fewer experts are needed to provide a custom fitted article of clothing to the customer 10. Further, by dramatically reducing the number of experts necessary to make the clothing industry function, the possibility of subjective differences between experts is similarly dramatically reduced.

The expert is trained to interpret sizing data from the photographs. Much of the sizing data, for example the nine circumferential measurements denoted by the tape measures 54–72, will be a simple matter of reading measurements directly from the front photograph. Other measurements are slightly more involved as will be described below.

After interpreting the sizing data, the expert enters a predetermined set of data into an integrated control system. The integrated control system is used to operate the machinery in a manufacturing process for fabricating the article of clothing that properly fits the customer without alteration. The integrated control system assigns a predetermined symbol to represent each data point. After interpreting the photographs to determine each given measurement, the expert enters the data as an input to the integrated control system corresponding to the assigned symbol.

Figure 2:
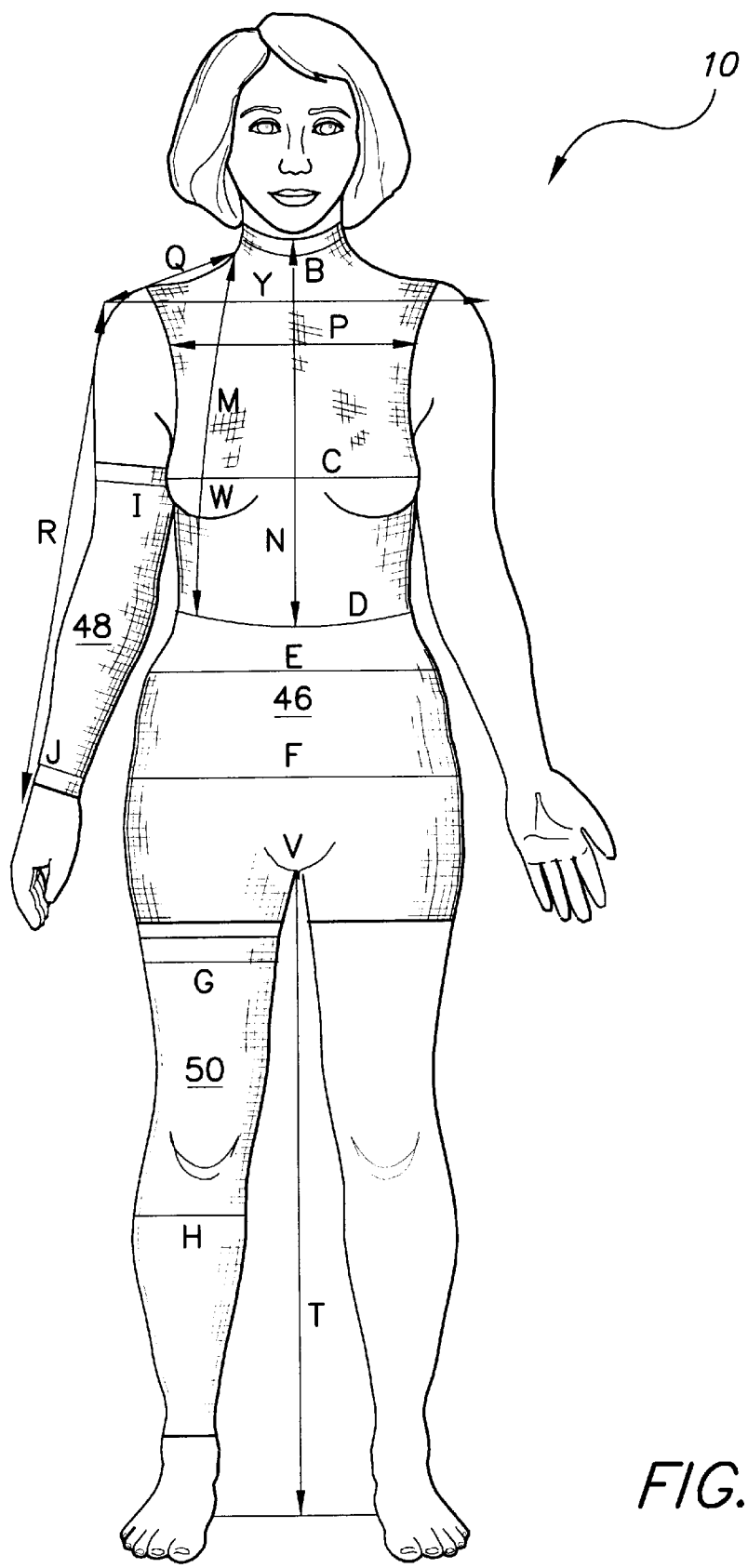
FIG. 2 is a front view of a model detailing measurements that are used in the photographic method of measuring for tailors according to the present invention.
Figure 3:
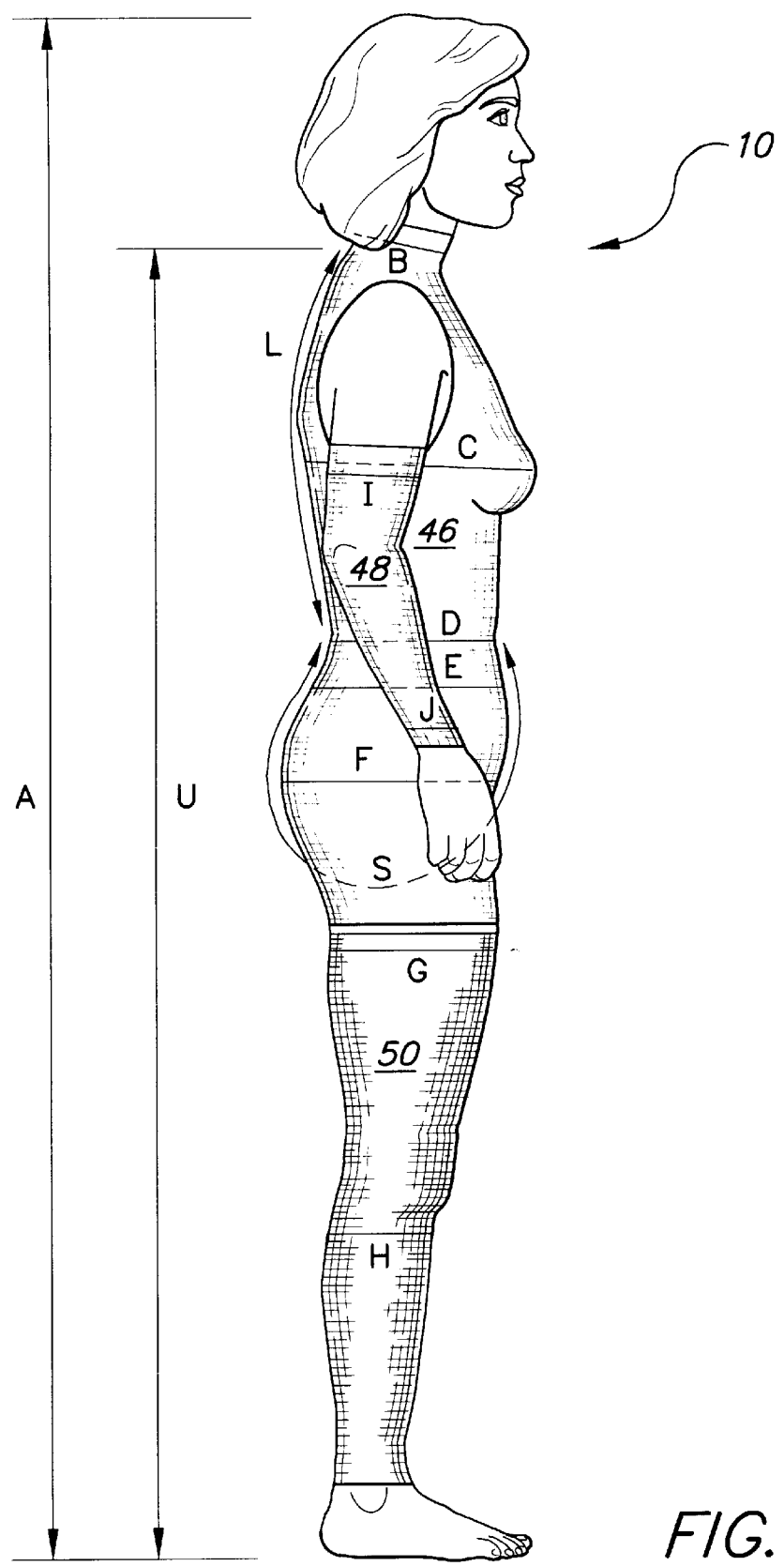
FIG. 3 is a right side view of a model detailing measurements that are used in the photographic method of measuring for tailors according to the present invention.
Figure 4:
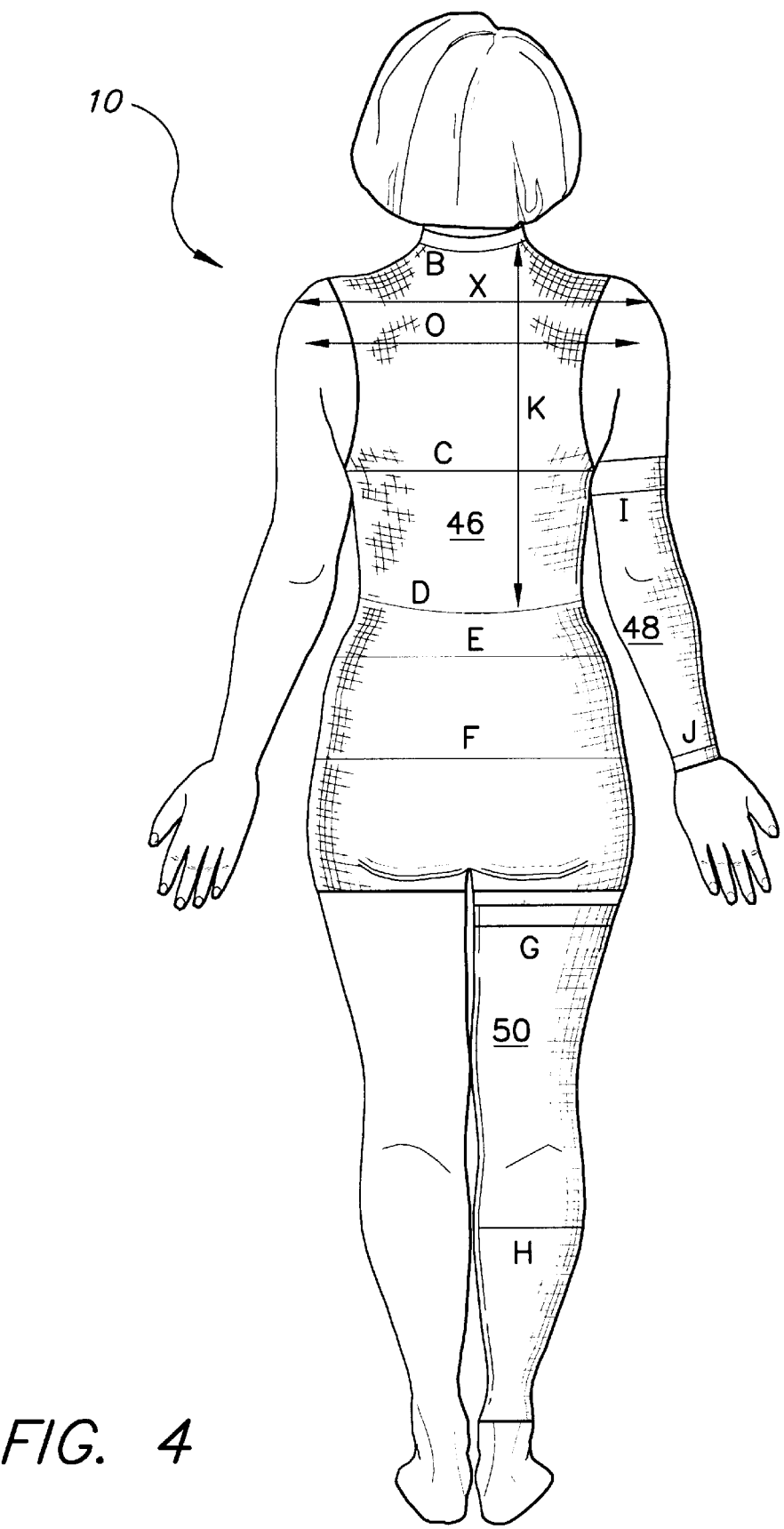
FIG. 4 is a rear view of a model detailing measurements that are used in the photographic method of measuring for tailors according to the present invention.

The recommended set of data for the preferred embodiment consists of twenty-five items. The recommended symbols for use with the recommended set of data are the letters of the english alphabet. Referring to FIG. 2, eighteen of the twenty-five items recommended for inclusion in the set of data are shown in a front view of the customer 10. FIG. 3 shows eleven of the twenty-five items recommended for inclusion in the set of data in a side view of the customer 10. FIG. 4 shows twelve of the twenty-five items recommended for inclusion in the set of data in a rear view of the customer 10. Following is a list of the twenty-five recommended data points as labeled in FIG. 2 through FIG. 4:

A. the full height of the customer 10;
B. the circumference of the customer's neck;
C. the circumference of the customer's bust or chest;
D. the circumference of the customer's waist;
E. the circumference of the customer's upper hips;
F. the circumference of the customer's lower hips;
G. the circumference of one of the customer's thighs;
H. the circumference of one of the customer's calves;
I. the circumference of one of the customer's biceps;
J. the circumference of one of the customer's wrists;
K. the length of the customer's back;
L. the distance from the customer's waist to the customer's neck at the center of the customer's back;
M. the distance from the point where one of the customer's shoulder's meets the customer's neck to the customer's waist through the customer's apex;
N. the distance from the customer's waist to the customer's neck at the front and center of the customer's torso;
O. the distance across the customer's back at the center of the customer's shoulder blades;
P. the distance across the customer's upper chest;
Q. the length of one of the customer's shoulders from the customer's neck to the top of one of the customer's arms;
R. the length from the top of one of the customer's arms, known as the shoulder junction, to one of the customer's wrists, plus three-quarters of an inch, thereby defining the customer's sleeve length;
S. the length from the center of the customer's waist at the front of the customer's torso to the center of the customer's waist at the customer's back through the customer's crotch, thereby defining the customer's crotch seam;
T. the length from the customer's crotch to the bottom of the customer's feet, thereby defining the customer's inseam;
U. the length from the customer's neck to the bottom of the customer's feet, thereby defining the customer's full length;
V. the center point of the customer's crotch;
W. one of the customer's apexes;
X. the distance across the customer's back at the shoulders; and,
Y. the distance across the customer's chest at the shoulders.

The rear view, FIG. 4, shows three measurements, K, O, and X, that are not visible in the front photograph or side photograph. A rear photograph is unnecessary however, because all three of these measurements, K, O, and X, are derived from information available to the expert from the front photograph. First, because the neck tape measure 54 is one inch higher in the rear than in the front, the length of the customer's back K is one inch longer than the distance from the customer's waist to the customer's neck at the front and center of the customer's torso N. Knowing this, the expert simply adds one inch to the measurement N as determined from the front photograph to arrive at the measurement K for data entry.

Similarly, the distance across the customer's back at the center of the customer's shoulder blades O is the distance across the customer's upper chest P plus seven-eighths of an inch. Thus, the expert simply adds seven-eighths of an inch to the measurement P, as determined from the front photograph, to arrive at measurement O for data entry. Likewise, the distance across the customer's back at the shoulders X is the distance across the customer's chest at the shoulders Y plus seven-eighths of an inch. Again, the expert simply adds seven-eighths of an inch to the measurement Y, as determined from the front photograph, to arrive at measurement X for data entry.

Because they involve an estimation based on curvature, measurements L and S require the greatest degree of training and expertise from the expert interpreting the photographs to obtain body measurements for entry with the set of data. The rest of the measurements are merely a matter of reading distances from the rear grid 18 in conjunction with the vertical tape measures 102, 104, the side grid 20, and the disposable tape measures 54–72 when the customer 10 is standing fully erect in the photographs. However, if the expert observes in the side photograph that the customer 10 is not standing fully erect, then the expert will make estimates based on curvature for additional measurements, such as A and U. Similarly, the expert is trained to make additional adjustments to the observable height and width readings from the grids 18, 20 in conjunction with the vertical tape measures 102, 104 if the expert observes from the photographs that the customer 10 is not standing with shoulders squared to the front camera 22.

Occasionally, in the first embodiment, the customer 10 is not standing on the pose spot 30 in the photographs. Sometimes this error occurs by accident. Sometimes it occurs by necessity, as may be the case when the customer 10 is unusually large in girth. If the customer 10 is standing on the platform 14 in a location other than the pose spot 30, the expert inputs the horizontal and lateral distance the customer 10 is standing away from the pose spot 30 to the integrated control system. If the customer 10 is closer to the grid 18, 20 than the pose spot 30, then the expert inputs a negative number. If the customer 10 is farther from the grid 18, 20 than the pose spot 30, then the expert inputs a positive number. After inputting any necessary correction factors as described, the expert then inputs the actual height and width readings observed from the grids 18, 20 and the vertical tape measures 102, 104 in the photographs and the integrated control system calculates the additional adjustments made necessary to those readings because the customer 10 is not standing on the pose spot 30. The preferred embodiment eliminates the need for these compensatory calculations.

Two of the twenty-five members of the recommended set of data, for computer entry, letters V and W, are points in space, not measurements. The apex W is necessary to determine measurement M because the apex W serves as the vertex for two straight lines, the sum of which equals M. It should be noted that the term apex is commonly understood in the art to refer to the nipple. The location of the crotch V assists in determining the length of the crotch seam. Furthermore, as is well known in the prior art and mentioned above, the machines that fabricate clothing need to match up certain points during the stitching of separate components of an article of clothing. The location of the apex W and the crotch V are typically needed for the garment fabrication programs to run the clothing manufacturing machinery.

The set of data actually entered into the computer by the expert after interpreting the photographs and making all necessary adjustments based on posture is known as the interpreted set of data. Once all twenty-five items in the interpreted set of data are entered to the integrated control system, the system loads a garment fabrication program designed to operate the clothing manufacturing machinery from stored memory in the integrated control system. The integrated control system has a garment fabrication program in memory for each article of clothing sold by the clothing establishment.

Next, the integrated control system modifies the selected garment fabrication program to incorporate the actual size of the customer 10 as represented by the interpreted set of data as entered by the expert. Additionally, the integrated control system modifies the selected garment fabrication program to compensate for expected shrinkage from a selected fabric, nap direction, to allow for a standard range of motion in the body of the customer 10 when the customer 10 is wearing the custom fitted article of clothing, and for other considerations standard in the clothing fabrication industry. Once the garment fabrication program is modified, the integrated control system controls the operation of the clothing manufacturing machinery to fabricate a custom fitting article of clothing for the customer.

Before repeating this process for the next customer 10, the integrated control system archives the interpreted set of data for the customer 10 and the expert archives copies of the front photograph and side photograph. Sometimes the customer 10 may feel uncomfortable having their name used to identify the photographs or the records of their measurements. In order to increase the degree of confidentiality with which this information is conveyed and archived, it is suggested that the information be conveyed and archived with a predetermined identification number instead of the name of the customer 10. When an identification number is used to identify the photographs and measurements of the customer 10, the identity of the customer 10 corresponding to each identification number is stored in a separate location. This improves the degree of confidentiality of the sizing measurements and photographs. As previously mentioned, when the customer 10 wears a mask, the anonymity of the photographs is improved.

The present invention is believed to be superior in its simplicity. With the exception of a minimal amount of training for the expert at the manufacturing facility, the present invention is a simple device using familiar products such as a camera 22, 24, tape measures 54–72, 102, 104, and a grid 18, 20. To the extent that the degree of special knowledge or training is reduced by the present invention, its use will result in a corresponding decrease in the price of the article of clothing supplied to the customer 10.

Similarly, the proper use of the present invention will require no more than ten minutes of time from the customer 10. Note also that the body suit is reusable. Thus, if the customer 10 returns on a subsequent occasion, the customer 10 reduces the amount of time even further by wearing the body suit under street clothing before arriving at the clothing establishment. To the extent that this reduces the amount of time demanded from a customer 10 seeking a custom tailored article of clothing, the present invention is an improvement over the prior art.

Furthermore, by eliminating the human labor involved in modifying the fit of an article of clothing after the article of clothing is purchased by the customer 10, by eliminating the need for a trained expert tailor or seamstress at every clothing establishment, and by eliminating the need to maintain an extensive inventory of so-called ready to wear clothing, collaterally reducing floor space requirements at the clothing establishment in the process, the present invention eliminates the four largest sources of overhead in the cost of an article of clothing while simultaneously decreasing the level of inconvenience to the customer 10.

If the customer 10 is a female and the customer 10 knows what style of clothing the customer 10 desires to purchase when the customer 10 returns on a subsequent occasion, it is recommended that the customer 10 wear the type of bra under the body suit that the customer 10 would anticipate wearing with the desired style of clothing. Since bras worn by females tend to vary in thickness and contour depending on the style of fashion worn, the bust measurement of the female generally experiences slight variations depending on the type of bra worn underneath the body suit. Consequently, the precision of the measurement indicated by the bust tape measure 56 is potentially improved when the type of bra worn underneath the body suit is the same type of bra that the female customer 10 expects to wear with the article of custom fitted clothing ordered. If the customer 10 is a female using the present invention for the first time, the customer 10 may not have anticipated the benefit of wearing a particular type of bra to the clothing establishment. In that case, for the sake of expediency, it is recommended that the present invention be used with whatever bra the customer 10 is wearing at that time. In most cases, the error caused is relatively inconsequential when the customer 10 wears a type of bra underneath the body suit different than the type of bra that the customer 10 will wear with the article of clothing ordered.

It is to be understood that the present invention is not limited to the embodiment described above, but encompasses any and all embodiments within the scope of the following claims.

I claim:

1. A photographic method for measuring by tailors comprising the steps of:

a. a customer donning a reusable, form fitting body suit;

b. temporarily adhering a strip of a disposable flexible tape measure circumferentially around a portion of the body suit, the tape measure having a visible measuring scale;

c. the customer standing on an elevated platform in front of a rear grid and to the side of a side grid, the customer standing as erect as possible;

d. photographing the customer with a front camera and a side camera simultaneously thus creating a side photograph and a front photograph;

e. moving a left tape housing through a left track to a predetermined location, the left tape housing containing a retractable left vertical tape measure in a retracted position;

f. moving a right tape housing through a right track to a predetermined location, the right tape housing containing a retractable right vertical tape measure in a retracted position;

g. extending the left vertical tape measure from the predetermined location of the left tape housing vertically down to a left groove, thus defining an extended position, the left groove being directly under and parallel to the left track;

h. fastening the left vertical tape measure in the left groove;

i. extending the right vertical tape measure from the predetermined location of the right tape housing vertically down to a right groove in the extended position, the right groove being directly under and parallel to the right track; and, i. fastening the right vertical tape measure in the right groove.

2. The photographic method for measuring by tailors according to claim 1, further comprising the step of weighing the customer.

3. The photographic method for measuring by tailors according to claim 1, wherein the rear grid is calibrated to correspond to height and width dimensions of the customer by compensating for parallax from a front camera to the rear grid, and the side grid is calibrated to correspond to height and width dimensions of the customer by compensating for parallax from a side camera to the side grid.

4. The photographic method for measuring by tailors according to claim 1, further comprising the steps of:

a. conveying the side photograph and the front photograph to a trained expert at a manufacturing facility for interpretation;
   b. entering a predetermined set of interpreted data into an integrated control system for operating a manufacturing process for fabricating an article of clothing; and,
   c. fabricating an article of clothing that properly fits the customer without alteration.

5. The photographic method for measuring by tailors according to claim 4 wherein the predetermined set of data includes the following:

a. the full height of the customer;
   b. the circumference of the customer's neck;
   c. the circumference of the customer's bust or chest;
   d. the circumference of the customer's waist;
   e. the circumference of the customer's upper hips;
   f. the circumference of the customer's lower hips;
   g. the circumference of one of the customer's thighs;
   h. the circumference of one of the customer's calves;
   i. the circumference of one of the customer's biceps;
   j. the circumference of one of the customer's wrists;
   k. the length of the customer's back;
   l. the distance from the customer's waist to the customer's neck at the center of the customer's back;
   m. the distance from the point where one of the customer's shoulder's meets the customer's neck to the customer's waist through the customer's apex;
   n. the distance from the customer's waist to the customer's neck at the front and center of the customer's torso;
   o. the distance across the customer's back at the center of the customer's shoulder blades;
   p. the distance across the customer's upper chest;
   q. the length of one of the customer's shoulders from the customer's neck to the top of one of the customer's arms;
   r. the length from the top of one of the customer's arms, known as the shoulder junction, to one of the customer's wrists, plus three-quarters of an inch, thereby defining the customer's sleeve length;
   s. the length from the center of the customer's waist at the front of the customer's torso to the center of the customer's waist at the customer's back through the customer's crotch, thereby defining the customer's crotch seam;
   t. the length from the customer's crotch to the bottom of the customer's feet, thereby defining the customer's inseam;
   u. the length from the customer's neck to the bottom of the customer's feet, thereby defining the customer's full length;
   v. the center point of the customer's crotch;
   w. one of the customer's apexes;
   x. the distance across the-customer's back at the shoulders; and,
   y. the distance across the customer's chest at the shoulders.

6. The photographic method for measuring by tailors according to claim 5, further comprising the step of making adjustments to the predetermined set of data based on the posture of the customer observed by the expert in the side photograph and in the front photograph thereby producing an adjusted set of data.

7. The photographic method for measuring by tailors according to claim 6 wherein the integrated control system modifies a garment fabrication program on record for the article of clothing being fabricated according to the adjusted set of data.

8. The photographic method for measuring by tailors according to claim 1 wherein the step of a customer donning a reusable form fitting body suit further comprises the steps of:

a. donning a top release liner the torso of the customer from crotch to shoulders, the top having a front center line extending vertically from top to bottom and a series of wide horizontal stripes extending circumferentially around the torso;
   b. donning a sleeve release liner an arm of the customer from the wrist to the armpit, the sleeve having a front center line extending vertically from top to bottom and a series of wide horizontal stripes extending circumferentially around the arm; and,
   c. donning a leg leotard release liner a leg of the customer from the ankle to the upper thigh, the leg leotard having a front center line extending vertically from top to bottom and a series of wide horizontal stripes extending circumferentially around the leg.

9. The photographic method for measuring by tailors according to claim 8 wherein the step of temporarily adhering a strip of a disposable flexible tape measure circumferentially around a portion of the form fitted article of clothing further comprises the steps of:

a. temporarily adhering a strip of a disposable flexible tape measure circumferentially around the neck;
   b. temporarily adhering a strip of a disposable flexible tape measure circumferentially around the bust or chest;
   c. temporarily adhering a strip of a disposable flexible tape measure circumferentially around the waist;
   d. temporarily adhering a strip of a disposable flexible tape measure circumferentially around the upper hip;
   e. temporarily adhering a strip of a disposable flexible tape measure circumferentially around the lower hip;
   f. temporarily adhering a strip of a disposable flexible tape measure circumferentially around a thigh;
   g. temporarily adhering a strip of a disposable flexible tape measure circumferentially around a calf;
   h. temporarily adhering a strip of a disposable flexible tape measure circumferentially around a wrist; and,
   i. temporarily adhering a strip of a disposable flexible tape measure circumferentially around the biceps.

10. The photographic method for measuring by tailors according to claim 9 further comprising the step of affixing a series of pieces of two-sided adhesive tape to the sizing clothing prior to temporarily adhering the disposable flexible tape measure, the pieces of two-sided adhesive tape having a stronger adhesive side and a weaker adhesive side wherein the weaker adhesive side is affixed to the body suit and the stronger adhesive side is adhered to the disposable flexible tape measure.

11. The photographic method for measuring by tailors according to claim 10 wherein the flexible tape measure is a paper strip having a dark colored block release liner the first two inches of the measuring scale, the tape measure being supplied from a roll having a series of identical paper strips.

12. The photographic method for measuring by tailors according to claim 11 wherein the predetermined set of data includes the following:

a. the full height of the customer;
b. the circumference of the customer's neck;
c. the circumference of the customer's bust or chest;
d. the circumference of the customer's waist;
e. the circumference of the customer's upper hips;
f. the circumference of the customer's lower hips;
g. the circumference of one of the customer's thighs;
h. the circumference of one of the customer's calves;
i. the circumference of one of the customer's biceps;
j. the circumference of one of the customer's wrists;
k. the length of the customer's back;
l. the distance from the customer's waist to the customer's neck at the center of the customer's back;
m. the distance from the point where one of the customer's shoulder's meets the customer's neck to the customer's waist through the customer's apex;
n. the distance from the customer's waist to the customer's neck at the front and center of the customer's torso;
o. the distance across the customer's back at the center of the customer's shoulder blades;
p. the distance across the customer's upper chest;
q. the length of one of the customer's shoulders from the customer's neck to the top of one of the customer's arms;
r. the length from the top of one of the customer's arms, known as the shoulder junction, to one of the customer's wrists, plus three-quarters of an inch, thereby defining the customer's sleeve length;
s. the length from the center of the customer's waist at the front of the customer's torso to the center of the customer's waist at the customer's back through the customer's crotch, thereby defining the customer's crotch seam;
t. the length from the customer's crotch to the bottom of the customer's feet, thereby defining the customer's inseam;
u. the length from the customer's neck to the bottom of the customer's feet, thereby defining the customer's full length;
v. the center point of the customer's crotch;
w. one of the customer's apexes;
x. the distance across the customer's back at the shoulders; and,
y. the distance across the customer's chest at the shoulders.

13. The photographic method for measuring by tailors according to claim 12, further comprising the step of making adjustments to the predetermined set of data based on the posture of the customer observed by the expert in the side photograph and in the front photograph thereby producing an adjusted set of data, and wherein the integrated control system modifies a garment fabrication program on record for the article of clothing being fabricated according to the adjusted set of data.

* * * * *